United States Patent
Pfister

(10) Patent No.: US 11,816,821 B2
(45) Date of Patent: Nov. 14, 2023

(54) METHOD AND SYSTEM FOR GENERATING AN ENRICHED IMAGE OF A TARGET OBJECT AND CORRESPONDING COMPUTER PROGRAM AND COMPUTER-READABLE STORAGE MEDIUM

(71) Applicant: Siemens Healthcare GmbH, Erlangen (DE)

(72) Inventor: Marcus Pfister, Bubenreuth (DE)

(73) Assignee: Siemens Healthcare GmbH, Erlangen (DE)

( * ) Notice: Subject to any disclaimer, the term of this patent is extended or adjusted under 35 U.S.C. 154(b) by 501 days.

(21) Appl. No.: 16/937,831

(22) Filed: Jul. 24, 2020

(65) Prior Publication Data

US 2021/0035274 A1 Feb. 4, 2021

(30) Foreign Application Priority Data

Aug. 1, 2019 (DE) .......................... 102019211526.8

(51) Int. Cl.
*G06V 10/77* (2022.01)
*G06T 5/50* (2006.01)
(Continued)

(52) U.S. Cl.
CPC ................ *G06T 5/50* (2013.01); *G06F 3/014* (2013.01); *G06F 3/016* (2013.01); *G06F 18/24* (2023.01);
(Continued)

(58) Field of Classification Search
CPC ........... G06T 15/04; G06T 19/00; G06T 7/00; G06T 2215/12; G06T 3/40; G06T 3/60;
(Continued)

(56) References Cited

U.S. PATENT DOCUMENTS

2013/0158365 A1 6/2013 Chey
2016/0162092 A1* 6/2016 Kukimoto ............... G06F 3/167
345/173

(Continued)

FOREIGN PATENT DOCUMENTS

CN 206120301 U 4/2017
JP 2004021820 A * 1/2004 ............. G06F 3/014
(Continued)

OTHER PUBLICATIONS

Bielefeld University "Tactile Sensors" screenshot from Aug. 29, 2018; https://www.cit-ec.de/de/taktilsensoren; pp. 1-2.
(Continued)

*Primary Examiner* — Quan M Hua
(74) *Attorney, Agent, or Firm* — Lempia Summerfield Katz LLC

(57) ABSTRACT

The disclosure relates to a method and a system for generating an enriched image of a target object and to a corresponding computer program and a computer-readable storage medium, on which the computer program is stored. In the method, image data of the target object is acquired. Furthermore, tactile data is acquired for the target object, which characterizes a mechanical resistance of at least one section of the target object against a force applied thereto. The enriched image is then generated by merging the image data and the tactile data and/or a classification of the respective section derived therefrom.

16 Claims, 5 Drawing Sheets

(51) Int. Cl.
*G06F 3/01* (2006.01)
*G06N 3/02* (2006.01)
*G06F 18/24* (2023.01)
*G06V 10/80* (2022.01)

(52) U.S. Cl.
CPC ............... *G06N 3/02* (2013.01); *G06V 10/80* (2022.01); *G06T 2207/20221* (2013.01)

(58) Field of Classification Search
CPC ... G06T 7/40; G06T 7/42; G06F 3/016; G06F 3/041; G06F 3/00; G06F 3/0487; G06F 3/0412; G06F 3/048; G06F 3/0481; G06F 3/14; G06F 1/1626; G06F 1/1643; G06F 2200/1634; G06F 3/017; G06F 3/042; G06F 3/0443; G06F 3/0484; G06K 9/00536
See application file for complete search history.

(56) References Cited

U.S. PATENT DOCUMENTS

2017/0328794 A1    11/2017   Mclaughlin
2020/0037950 A1*    2/2020   Egorov ................ A61B 5/6867

FOREIGN PATENT DOCUMENTS

KR           101492803 B1 *   2/2015
WO       WO2010018525 A1      2/2010
WO       WO-2017013834 A1 *   1/2017   ............... G06F 3/01

OTHER PUBLICATIONS

German Office Action for German Application No. 10 2019 211 526.8 dated Mar. 30, 2020.

Kauffmann, Claude, et al. "Source of errors and accuracy of a two-dimensional/three-dimensional fusion road map for endovascular aneurysm repair of abdominal aortic aneurysm." Journal of Vascular and Interventional Radiology 26.4 (2015): 544-551.

Mountney, Peter, et al. "An augmented reality framework for soft tissue surgery." International Conference on Medical Image Computing and Computer-Assisted Intervention. Springer, Cham, 2014. pp. 1-9.

Vimeo Video "Senhance Surgical Robotic System—Security of Haptic Force Feedback" TransEnterix, Inc.; Vimeo Video from Nov. 2016; https://vimeo.com/190582670.

Sigrist, Rosa MS, et al. "Ultrasound elastography: review of techniques and clinical applications." Theranostics 7.5 (2017): 1303-1329.

* cited by examiner

US 11,816,821 B2

METHOD AND SYSTEM FOR GENERATING AN ENRICHED IMAGE OF A TARGET OBJECT AND CORRESPONDING COMPUTER PROGRAM AND COMPUTER-READABLE STORAGE MEDIUM

The present patent document claims the benefit of German Patent Application No. 10 2019 211 526.8, filed Aug. 1, 2019, which is hereby incorporated by reference.

TECHNICAL FIELD

The disclosure relates to a method and a system for generating an enriched, (e.g., augmented), image of a target object or one supplemented by additional data or information. The disclosure further relates to a corresponding computer program and a computer-readable storage medium, on which a computer program of this kind is stored.

BACKGROUND

Nowadays, imaging methods are a popular and valuable tool in many technical and industrial fields of application. In particular, different imaging methods for assisting diagnoses and treatments have established themselves in medicine or medical technology. Because further improvements may benefit the patient's well-being directly, further development is still of particular interest.

Approaches exist in which images from different sources are superimposed on each other or virtual objects are overlaid in a medical image in the framework of augmented reality. For example, Peter Mountney and Johannes Fallert et al. describe in "An Augmented Reality Framework for Soft Tissue Surgery" (PMID: 25333146) a methodology for intra-operative planning. In this case, a pre-operative CT image is co-registered with stereo-laparoscopy images, wherein CBCT (cone beam CT) and fluoroscopy are used as bridging modalities.

SUMMARY AND DESCRIPTION

The object of the present disclosure is to enable a further improved therapeutic outcome in the image-supported medicine.

The scope of the present disclosure is defined solely by the appended claims and is not affected to any degree by the statements within this summary. The present embodiments may obviate one or more of the drawbacks or limitations in the related art.

A method is provided herein for generating an enriched image or image data set of a target object. The target object may be an examination object, a patient, part of a patient, a tissue region or organ region, a tissue sample, or the like. An enriched image may refer to a combined image or a combined image data set, which not only depicts the respective target object directly, but also contains or represents further data or information, in particular, is augmented therefore. The enriched image may be a single image, although the method may also be carried out correspondingly for a series of single images or a video, so then a series of enriched single images or an enriched video may be generated accordingly.

In one act of the method, recorded image data of the target object is acquired by an imaging modality, in particular, a medical imaging modality. This image data may include an X-ray image, a fluoroscopy image, a CT image or CT data set, a magnetic resonance image or data set, an ultrasound image, an optical image or camera image (e.g., as a laparoscopy image or video), and/or the like, which each depict the target object. Here, the imaging modality may therefore designate a corresponding recording mode or a recording device used for this.

In a further method act, tactile data is acquired for the target object, and this characterizes or indicates a mechanical resistance or a mechanical property, for example, a strength, rigidity and/or elasticity, or the like, at least a section or point of the target object against a force applied to or acting on the target object, in particular, a compressive force/or tensile force. The tactile data may be of different kinds, for example, corresponding measurement or sensor data or data derived or calculated therefrom.

In a further method act, the enriched image is generated by merging the acquired image data and the acquired tactile data and/or a classification derived therefrom of the section or point of the target object. In one example, the tactile data and/or the classification derived therefrom therefore form the additional data by which the enriched image is supplemented or augmented with respect to the pure recorded image data, wherein at least one tactile property of the target object is described or rendered visible by this additional data. Merging the different data may denote direct overlaying, superimposing, or annotating, for example, of data points of the image data with the additional data, but may include one or more intermediate or processing act(s) of the image data and/or the additional data, in other words, the tactile data and/or the classification derived therefrom. Acts of this kind may include filtering or converting, e.g., bringing the respective data into a different form, registering the different data or data sets or the coordinate systems thereof with each other or with or in a shared coordinate system, and/or the like.

The tactile data may include location coordinates, (e.g., position data), which in each case indicates at which point or at which location the respective tactile data or measurement or sensor data underlying it were recorded, were measured therefore. For this, a sensor used for recording the tactile data or measurement or sensor data underlying it may be tracked in respect of its position or spatial location, for example, by a conventional tracking system. In addition, or as an alternative, for example, a respective user input may be acquired, which indicates at which point or points or sections the respective data was recorded or measured. Similarly, in each case, a point or section may be marked or specified automatically or manually, for example, in or on the image data, for which the tactile data or measurement or sensor data underlying it is then acquired or measured and acquired. To record or measure the tactile data or the measurement or sensor data underlying it, the target object may be contacted by the corresponding sensor and be subjected to a force.

Acquiring the image data and/or the tactile data may include recording or measuring the image data and or the tactile data. Additionally, or alternatively, acquiring this data may denote or include receiving or retrieving the (e.g., already recorded or measured) image data and/or tactile data via an electronic software or hardware data interface or from a data memory. The present method may therefore be carried out without surgical acts or measures mentioned or indicated in the present case, which are not explicitly part of the method. The present disclosure, in particular the method, is therefore being claimed only insofar as the disclosure or the method does not include a surgical act. This does not conflict with the practicability or applicability of the present disclosure, however, because, as illustrated, in particular, the used data may be retrieved from a data memory. The method may be understood merely as an operating method of an appropriately configured data processing device or an appropriately configured system and/or the tactile data may be recorded, for example, by external mechanical contacting of the target object without surgical act or procedure. Accordingly, the method may be wholly or partially implemented by computer.

In the present disclosure, advantageously, a further dimension of data or information about the respective target object is made available in the enriched image by way of the tactile data and/or the classification derived therefrom. As a result, a respective observer, (e.g., a physician devising plans or treatment or other medical or technical staff), is afforded improved or more extensive knowledge about properties or a condition of the respective target object. Because the enriched image may have a higher information density compared to the pure image data therefore, the enriched image may impart corresponding data or knowledge particularly quickly, efficiently and with little deviation because, for example, an observer does not have to use a plurality of mutually independent data sources.

The present disclosure is based on the knowledge that tactile data or corresponding tactile or mechanical properties of the respective target object may be an important dimension or component for a complete, reliable, and accurate evaluation or assessment of the respective target object or its condition and ultimately for a successful diagnosis and/or treatment. For example, diseased tissue, (e.g., a tumor), may be perceptibly and/or measurably differentiated in its mechanical properties from healthy tissue, in particular independently of another differentiability, (e.g., independently of whether the diseased tissue and the surrounding healthy tissue look different). For example, an experienced physician or other staff may palpate mechanical properties of the target object and consequently identify, for example, a tumor, an organ or an organ border, a vessel, optionally pulsating, different tissue types and/or states, or the like. Such tactile data and knowledge based thereon has hitherto only been available to the respective person performing the palpations as a subjective sensory impression, however. In addition, situations occur, for example, with robotically assisted methods or in the framework of telemedicine, in which even an experienced physician could not previously obtain the tactile data because the physician is decoupled from the respective target object, experiences a section to be examined or treated in each case only indirectly therefore. This may make additional measures necessary, such as marking with clips or markers or a dye, and this may signify additional stressing of the target object and additional potential for errors.

By contrast, the present disclosure makes the tactile data available irrespective of the situation and is therefore also available to people who in each case have no direct contact to or with the respective target object. The present disclosure therefore provides a transfer or an embedding of tactile data in, for example, data and information provided to a respective physician and/or for planning procedures. As a result, advantageously, a diagnosis, treatment planning and ultimately also actual treatment may be supported.

In an advantageous embodiment, a live image of the target object is acquired as the image data or as part of the image data. This live image may be a single image. Similarly, a plurality of single images or a series or a stream of single images or a video or video signal (e.g., video stream) may be acquired as the image data or as part of the image data.

In certain examples, the at least one live image or live video may be recorded by a laparoscopy or as an angiography or fluoroscopy. The enriched image may then be generated by overlaying the tactile data and/or the classification derived therefrom or a corresponding representation in the live image or live video. For this, a sensor or a sensor system for recording the tactile data may be registered directly with an imaging modality used for recording the image data and/or tactile data may be recorded for one or more specified points of the target object, (e.g., by contacting this point or points by the transmitter or the sensor system). A shared coordinate system may likewise be determined or established therefore, whereby subsequent, (e.g., automatic), registering of the tactile data with the image data is enabled or simplified.

By using the live image or live video as image data, as the basis for the enriched image therefore, the tactile data may advantageously be provided for planning or treatment support even when the physician devising the plans or treatment cannot palpate the target object directly himself, for example. In addition, advantageously, the tactile data may also be rendered visible to other staff, for example, an OP team or an external consultant or the like, resulting in additional safeguarding and therewith a reduction in the probability of planning or treatment errors.

In a further advantageous embodiment, a pre-operative image data set of the target object, (e.g., a three-dimensional one), is acquired as the image data or part of the image data. The pre-operative image data set may be a CT, MRT, or ultrasound image data set or the like recorded before the beginning of a procedure. Advantageously, the enriched image may then be available before the beginning of a possible procedure, (e.g., before a resection), and therefore enable particularly accurate and reliable procedural planning and implementation.

In particular, the tactile data is available here so the data may be objectively checked, so, for example, the physician responsible or other staff do not have to rely on a possibly unreliable memory, or one that changes over time, or a person's subjective assessment. This may advantageously likewise contribute to improved successful treatment and a reduction in a probability of error. The enriched pre-operative image data set then generated in the present embodiment may for its part be overlaid with a live image or live video of the target object or be merged therewith. Consequently, a further increased information density and therefore a more complete image of the target object or its condition may advantageously result for respective staff.

In a further advantageous embodiment, a sensor system used for recording the tactile data or measurement or sensor data underlying it is automatically spatially tracked during recording of the tactile data. Based on this the tactile data is automatically assigned its respective recording or measuring location. In other words, the tactile data may be annotated with a respective position and respective coordinates therefore. Similarly, the actual measurement or sensor data and the associated positions or coordinates may be in the form of two data sets, which are each provided with time stamps, so an assignment between one item of measurement or sensor data respectively and the position or the coordinates, at which it was recorded, may take place via the time stamp, however. Depending on the implementation, the assignment or linking may likewise be possible in other ways.

Automatic registering of the tactile data with the image data is advantageously enabled or simplified by the automatic assignment provided here of the respective recording location to the recorded or measured measurement or sensor data. For example, a coordinate system of the image data or an imaging modality used for recording it, a coordinate system of the sensor system or a tracking device used for tracking the sensor system or a shared coordinate system may be used in this connection.

For example, an external tracking device, which is designed to track the sensor system, for example optically, electromagnetically or on the basis of X-rays, may be used for tracking the sensor system. In addition or as an alternative, the sensor system may have a separate position-determining or position- or movement-tracking device. This device may include an Inertial Measurement Unit (IMU) or an Inertial Navigation system (INS).

The sensor system may have at least one force/or pressure sensor for recording the actual tactile data or the measurement or sensor data underlying it. Overall, it is thereby possible to detect, for example, at which force exerted or acting on the target object the object yields, with which force the target object presses against the sensor system and/or the like. A course over time of the measurement or sensor data may be recorded in the process, making a particularly accurate and reliable characterization of the target object or of its mechanical properties possible. For example, a pulse or heartbeat and a pressure variation associated therewith may be thus identified using the course over time, and this in turn allows conclusions to be drawn as to whether, for example, a blood vessel runs in or on the respective section of the target object.

In a further advantageous embodiment, the tactile data or measurement or sensor data underlying it is at least partially acquired by a sensor device designed as a glove, in which at least one corresponding force and/or pressure sensor, in particular the sensor system therefore, is integrated in at least one fingertip region of the glove. Similarly, the sensor system or the at least one force and/or pressure sensor may be arranged on another instrument, (e.g., a probe, a camera, a gripper, or the like). The embodiment of the sensor device provided here as a glove advantageously allows a particularly intuitive and accurate palpitation of the target object, and therewith correspondingly advantageous recording or gathering of the tactile data. Because a force and/or pressure sensor is used, the tactile data may be recorded or measured objectively and particularly accurately and reliably, for example, in contrast to an indication or evaluation based solely on sensory impressions.

The embodiment of the sensor device as a glove is particularly advantageous against the background that, at least according to the current prior art—in particular taking into account equipment that is actually available, for example in hospitals or treatment centers—the human fine motor skills, by which the sensor device is controlled here, is brought into contact with the target object therefore, are overlaid with robotic equivalents in respect of mobility, force regulation, and ability to prevent injuries to the target object.

In a further advantageous embodiment, the tactile data is acquired at least partially in the form of a user input. In other words, a corresponding input screen or selection screen may be provided therefore, via which a respective user may input, for example, for a specified section or point of the target object respectively, mechanical resistance, or properties thereof or a corresponding evaluation or classification, for instance in respect of a state of health or a tissue type, a subjective impression and/or a supplementary annotation, or the like. An input of this kind may advantageously at least partially reflect the experience of a user, (e.g., a physician carrying out the treatment or making the diagnosis), and the human perceptive faculty that is still superior to the currently available technology and make it technically usable. The input may be acquired via a keyboard, a touch-sensitive screen, as a speech input via a microphone, as a gesture by a camera or gesture acquisition device, and/or the like. In addition or as an alternative to measurement or sensor data acquired by a sensor system, a user input of this kind may be acquired as part of the tactile data.

In a further advantageous embodiment, tactile data is acquired for a large number of spatially distributed points or sections of the target object. In other words, the tactile data may then characterize the mechanical resistance or the mechanical properties of the target object at different points or in different sections therefore. This advantageously allows a particularly comprehensive understanding of the respective situation, e.g., of the respective condition of the target object, and, accordingly, a particularly accurate and reliable diagnosis or treatment. Therefore, for example, particularly accurate borders or courses of particular physiological features, for example, tumor borders, tissue borders, vessels or vessel courses, and the like may be determined or identified using the tactile data.

In a further advantageous embodiment, the tactile data is represented so as to be color-coded in the enriched image according to a specified scale. In other words, for example, a first color may be assigned to a first resistance or a first strength, rigidity, or elasticity; and a second color may be assigned to a second resistance or a second strength, rigidity, or elasticity, etc. For example, a particularly high strength or one which lies above a value range specified for healthy tissue as a function of organ or tissue may be represented by a red color, and a strength lying within the value range specified for healthy tissue by a green color. A color-coded representation of the tactile data, of the mechanical properties of the target object therefore, means it is advantageously possible to achieve particularly simple, intuitive, and fast conveying of the tactile data to a respective user or observer of the enriched image. It is optionally possible to interpolate between a plurality of measuring points or measuring ranges in order to achieve an optimally two-dimensional coloring of the target object, representing the tactile data, in the enriched image. In addition to, or as an alternative to such color-coded representation of the tactile data, other or further representation or partial representations of the tactile data or some of the tactile data may be possible.

In an advantageous development, for generating the enriched image, the tactile data is overlaid on the image data at least in the form of color-coded points or symbols. In other words, a point representing this resistance in color-coded form or a corresponding symbol is arranged or overlaid in the image data or in the enriched image on one point respectively or in one section respectively on or in which the mechanical resistance of the target object was measured or determined. Consequently, the tactile data, the mechanical properties of the target object therefore, may be conveyed particularly accurately and reliably, making it ultimately possible to support successful diagnosis or treatment.

Advantageously, a data volume to be processed and displayed may be reduced or, in particular in real time, be rendered manageable by the use of the color-coded points or symbols, with it simultaneously being possible, however, to represent the tactile data purposefully for points or sections of the target object, in other words, render it visible, which is of particular interest in the respective application. For example, the tactile data may be selectively overlaid on an actual or suspected tumor or tissue border or along a vessel course or the like, whereas, for example, a central region of a tumor or a particular tissue region may be kept free of corresponding overlays to enable an optimally unhindered view of the respective section or tissue region.

In a further advantageous embodiment, the tactile data is represented in the enriched image at least in the form of numerical data, which quantifies the mechanical resistance or the mechanical properties of the target object according to underlying measurement or sensor data. The numerical data may correspond to the measurement or sensor data, corresponding measured values therefore, or be numerical data derived or calculated therefrom, (e.g., a standardized strength value, a difference from a specified reference value, and/or the like). Such numerical data may be provided in addition to the color coding, in particular, selectively or in certain areas in at least one specified Region of Interest (ROI). Advantageously, the target object may be particularly accurately characterized by overlaying the numerical data, and this may likewise ultimately benefit successful diagnosis or treatment.

In a further advantageous embodiment, the tactile data or measurement or sensor data underlying it is fed as input data to an automatic classifier, in particular, a neural network. The measurement or sensor data may be used, in particular, when the tactile data is itself data that has already been processed further and/or includes, for example, additional annotations or evaluations of a user or the like. The automatic classifier is designed, (e.g., trained), to classify at least the respective section of the target object as a function of corresponding input data in respect of a tissue type and/or in respect of a state of health. The image data may also be fed or provided to the classifier as input data. A classification generated by the classifier by processing the respectively fed or provided input data is then integrated at least as part of the tactile data, or in addition thereto, in the enriched image, is represented therein therefore, for example, is superimposed on the image data. The classification in respect of the tissue type may denote a categorization as a vessel, organ, tumor in the connective tissue, and/or the like. A classification in respect of the state of health may denote a categorization as healthy tissue compared to a pathological or tumor-like tissue or a categorization as healthy tissue compared to a pathological change, such as a calcification or the like. The classification or its representation in the enriched image may also be combined with the color coding or take place in the form of color coding.

The classifier may also be provided with further input data, which may be specific to the respective target object. For example, the target object may be characterized or specified by parameter values such as age, medical history, organs, or regions palpated for recording the measurement or sensor values, blood pressure values during recording of the measurement or sensor data or the tactile data and/or the like.

The embodiment proposed here is based on the recognition that with the advances achieved in recent years in the field of artificial intelligence, (e.g., of neural networks), a corresponding automatic classifier may perform corresponding classifications or categorizations faster and at least just as reliably as a person, with a performance of the automatic classifier not being dependent on daily form, so, ultimately, an error probability may be reduced and improved method efficiency and objectivity achieved.

In order to train the automatic classifier, it may be provided with appropriately annotated training data, for instance data sets of tactile data therefore, in which different tissue types and/or healthy and pathological tissue regions are identified. A method and an appropriately designed and configured system or a device, (e.g., a computer), for training the automatic classifier for classifying target object or sections, for which tactile data or tactile data and image data was recorded, in respect of a tissue type and or a state of health, are each further aspects.

A further aspect of the present disclosure is a computer program, which includes or encodes commands or control instructions, which on execution of the computer program by a computer or a system for generating an enriched image of a target object causes this computer or this system to carry out at least one variant or embodiment of the method, (e.g., automatically or semi-automatically). The computer program includes program code, which represents or encodes the method acts of the method.

A further aspect of the present disclosure is a computer-readable storage medium, on which at least one embodiment or variant of the computer program is stored. Furthermore, the computer-readable storage medium may contain further program code, for example, for providing a user interface for interacting with the computer program and/or for linking the computer program to further data carriers, devices, and/or programs or software components.

A further aspect of the present disclosure is a system for generating an enriched image of a target object. The system has at least one acquisition device for acquiring image data of the target object and for acquiring tactile data of the target object, which characterize a mechanical strength, rigidity, and or elasticity of at least one section of the target object. For acquiring the image data and tactile data, a separate acquisition device, (e.g., a first and a second acquisition device), may be provided in each case therefore or a combined or shared acquisition device may be used. In addition, the system has a data processing device for processing the acquired image data and the acquired tactile data to form an enriched image of the target object, with the enriched image representing the image data and the tactile data.

The acquisition device or devices may include data, hardware, and/or software interfaces, an imaging device (e.g., a medical device), a pressure and/or force sensor system, and/or the like.

The data processing device may include a processor, (e.g., a microchip or microcontroller), and a data memory connected thereto. This data memory may be the computer-readable storage medium. At least one variant of the computer program, (e.g., as part of an operating program or operating system of the system), may be stored on the data memory therefore.

The system may be designed and configured therefore, in particular, to carry out the method, e.g., automatically or semi-automatically. Accordingly, the system may have some or all of the properties and/or elements or components mentioned in connection with the method and/or the remaining aspects of the present disclosure.

Developments of the different aspects of the disclosure, which exhibit features as are described only in connection with one or some of these aspects, also form part of the disclosure. To avoid unnecessary redundancy, the corresponding developments of the present disclosure are not separately described again here for all aspects.

The disclosure also includes the combinations of the features of the described embodiments.

BRIEF DESCRIPTION OF THE DRAWINGS

Exemplary embodiments are described below. In the drawings.

DETAILED DESCRIPTION

Figure 1:
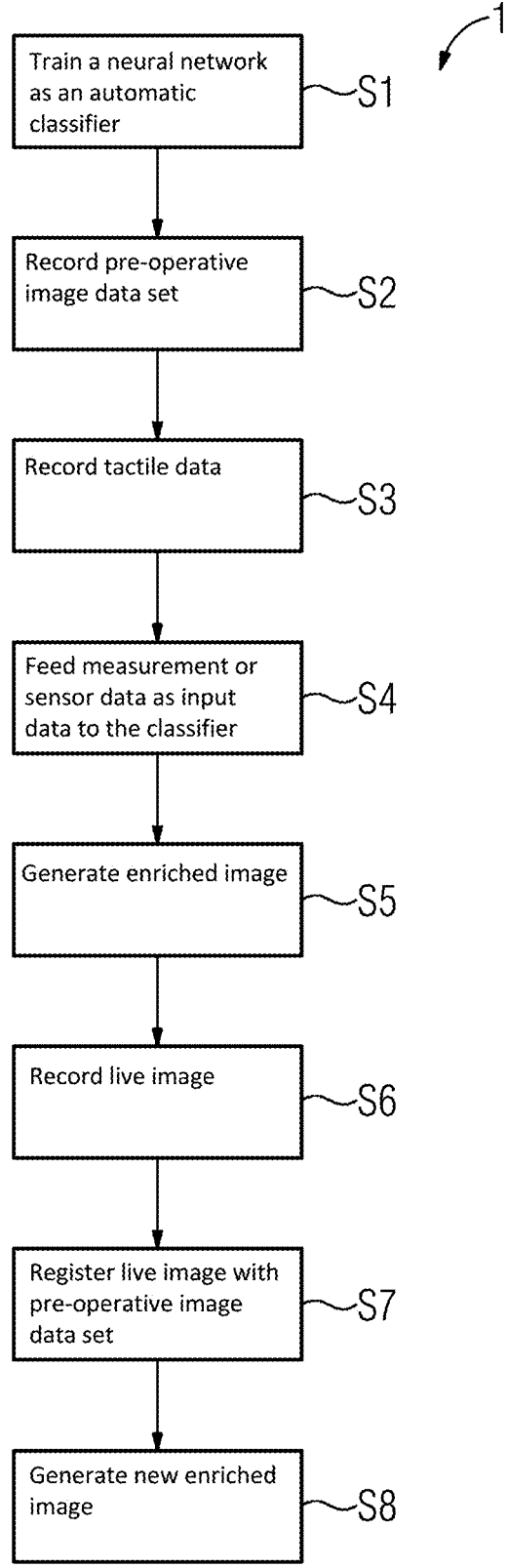
FIG. 1 depicts an exemplary schematic flowchart for a method for generating an enriched image of an examination object.

In the exemplary embodiments described herein, the described components of the embodiments in each case represent individual features of the disclosure which are to be considered independently of each other and which develop the disclosure independently of each other respectively as well. The disclosure may also include combinations of the features of the embodiments other than those illustrated. Furthermore, the described embodiments may also be supplemented by further features of the disclosure already described.

In the figures, identical reference numerals in each case denote elements with the same function or mutually corresponding elements.

For the purpose of explanation, reference is made hereinafter by way of example to a tumor resection, for example of a liver tumor, although this is not expressly the only field of application of the measures and processes described here. Therefore, a further field of application may lie, for example, within the framework of detection of a breast maycer or the like.

One of the main problems in tumor resection is locating the tumor borders. Firstly, the tumor may be removed as completely as possible. Secondly, as far as possible, none of the healthy tissue surrounding the tumor should be removed, however, in order to not damage the respective affected organ more than necessary. A further problem lies in the avoidance of unnecessary damage, for example, severing blood or supply vessels. Approaches already exist, in particular, for the purpose of planning support, for superimposing different data or information on each other, wherein, previously, the overlaid information was solely of the morphological or functional type. For example, magnetic resonance data or nuclear medical data is superimposed on an X-ray image therefore.

Important information or an important type of data, both in the planning and in an actual procedure, is tactile data, however. An experienced surgeon may palpate a tumor, (e.g., with optionally minimally invasive procedures), because the surgeon may palpate the mechanical resistance, in other words, a strength, rigidity, and/or elasticity of the tumor or a corresponding node—or, e.g., a change in tissue or the like. Vessels that run on or under the surface of an organ or tissue may be palpated based on their mechanical properties that differ from a surrounding tissue and/or on the basis of pressure variations in the rhythm of the pulse or heartbeat. Tactile data is thereby available to the respective surgeon. This may be subjective sensations, however, that are not available to other staff. In addition, a respective surgeon cannot always obtain tactile data of this kind, for example, in the case of robot-assisted procedures or ones carried out telemedically or if, for example, the surgeon is consulted subsequently in an advisory capacity or to give a second opinion using image data without having to come into contact with a respective target object, (e.g., a respective patient).

Against this background, a method for generating an enriched image 16 (cf. FIGS. 5 to 7) is proposed for solving the described problems and challenges and to improve the basis for diagnosis and treatment. FIG. 1 shows in this regard an exemplary schematic flowchart 1 for a method of this kind with method acts S1 to S8, which is explained below with reference to the remaining figures.

In method act S1, a neural network is trained as an automatic classifier 29 (cf. FIG. 8) for classifying sections of a target object in respect of a tissue type and/or a state of health. For this, appropriately annotated tactile data and image data is fed to the neural network, which data may originate, for example, from earlier examinations and/or may be at least partially artificially generated, in other words synthetically.

Figure 8:
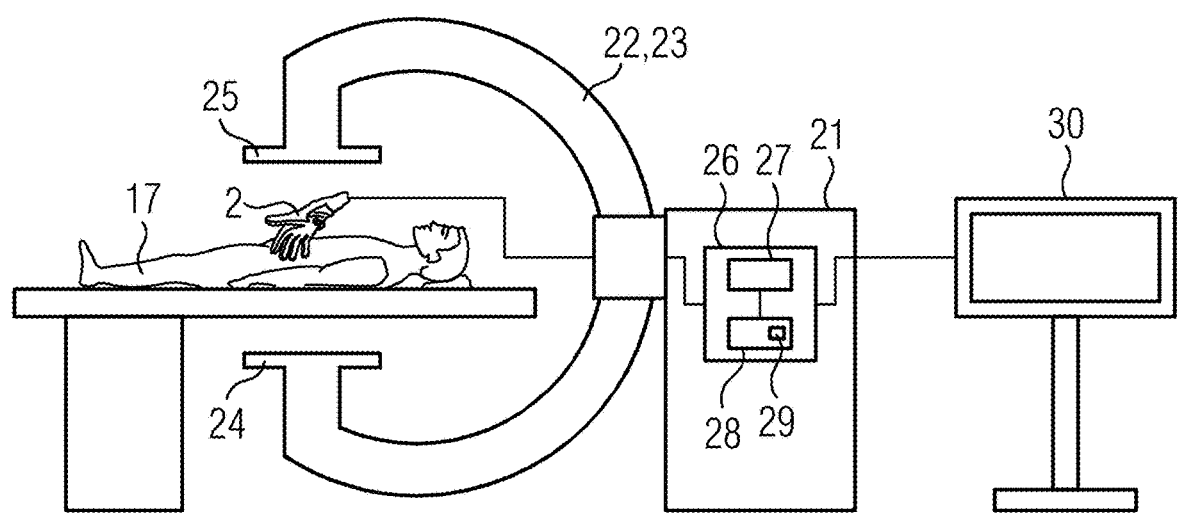
FIG. 8 depicts an exemplary schematic diagram of a system for carrying out the method.

In method act S2, a pre-operative image data set 15 (cf. FIG. 5) of the respective target object, in the present case, for example, a CT data set of an organ 11 (cf. FIG. 4) or a patient 17 (cf. FIG. 5) is recorded. For this, for example, a system 21 as is schematically illustrated in FIG. 8 may be used. This system 21 has for this purpose an image acquisition device 22, which, for its part, is designed in the present case as a C-arm X-ray apparatus. For this, a beam source 24 and, opposing it, a detector 25 are held on a C-arm 23. For acquiring and processing corresponding image data, (here, in other words, for example, X-ray or CT image data), the system 21 has a data processing device 26 with a processor 27 and a data memory 28 connected thereto. A computer program, which implements some or all of the method acts S1 to S8, is stored on the data memory 28, so the method acts S1 to S8 schematically indicated in FIG. 1 may be understood as corresponding program modules or function blocks of this computer program therefore. In addition, the classifier 29 is also stored on the data memory 28 in the present case. Furthermore, the system 21 has a display 30 connected to the data processing device 26, by which the enriched image 16, generated in particular by the data processing device 26, may be output.

Figure 2:
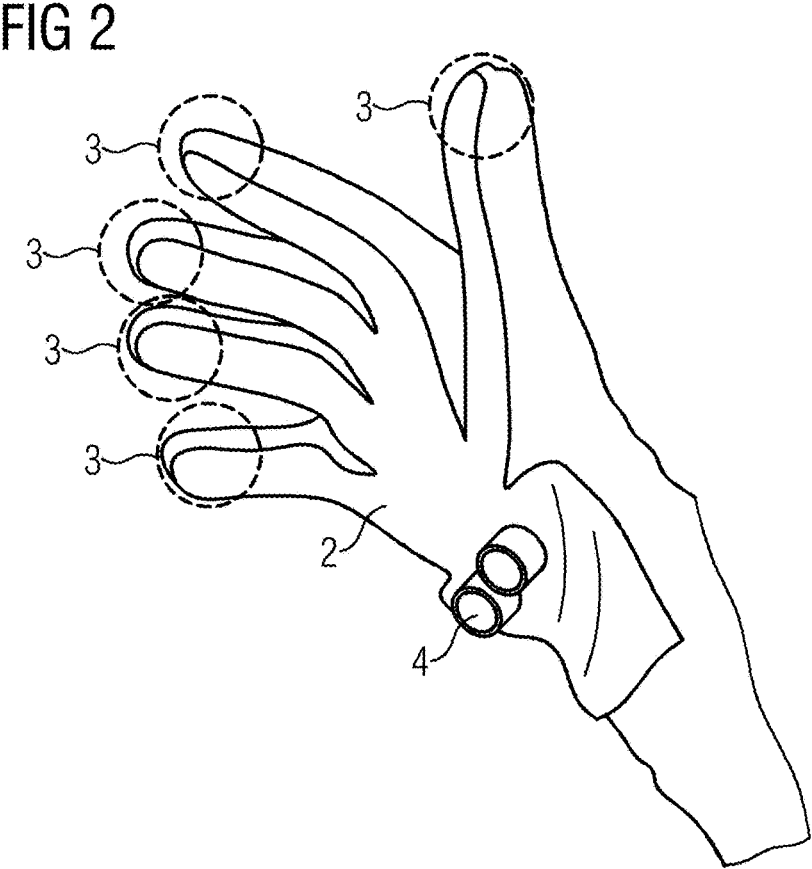
FIG. 2 depicts an exemplary schematic perspective view of a sensor glove for recording tactile data.

In method act S3, tactile data is recorded for the target object. For this, for example, the organ 11 or the patient 17 may be palpated by a sensor device for measuring a force or a pressure, which may be applied to the organ 11 or the patient 17 until it yields. In the present example, a sensor glove 2, illustrated in a schematic perspective view in FIG. 2, is used as the sensor device for this. The sensor glove 2 has a plurality of sensors 5 (cf. FIG. 3) integrated in its fingertip regions 3. Furthermore, in the present example, the sensor glove 2 has connectors 4, via which it may be provided, for example, with current. In addition, measurement or sensor data recorded by the sensor glove 2 or the sensors 5 may be transmitted via the connectors 4 to the system 21 or the data processing device 26. For this, the sensor glove 2 may be connected, for example, via a cable or wireless datalink, to the system 21 or to the data processing device 26.

Figure 3:
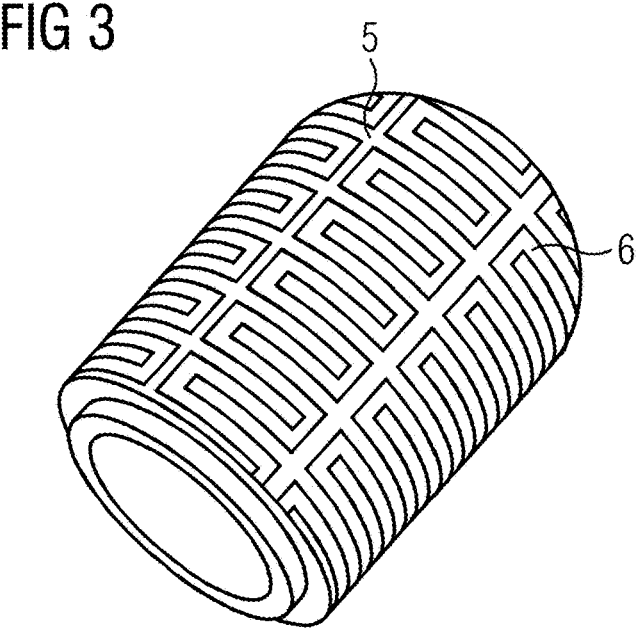
FIG. 3 depicts an exemplary schematic perspective view of a sensors of the sensor glove.

For further illustration, FIG. 3 shows a schematic perspective view of a sensor 5 integrated in the fingertip regions 3 of the sensor glove 2. The sensor 5 has an at least substantially thimble-like form and on its surface has a plurality of meandering conductor loops 6, which enable, for example, a capacitive force or pressure or deformation measurement.

Figure 4:
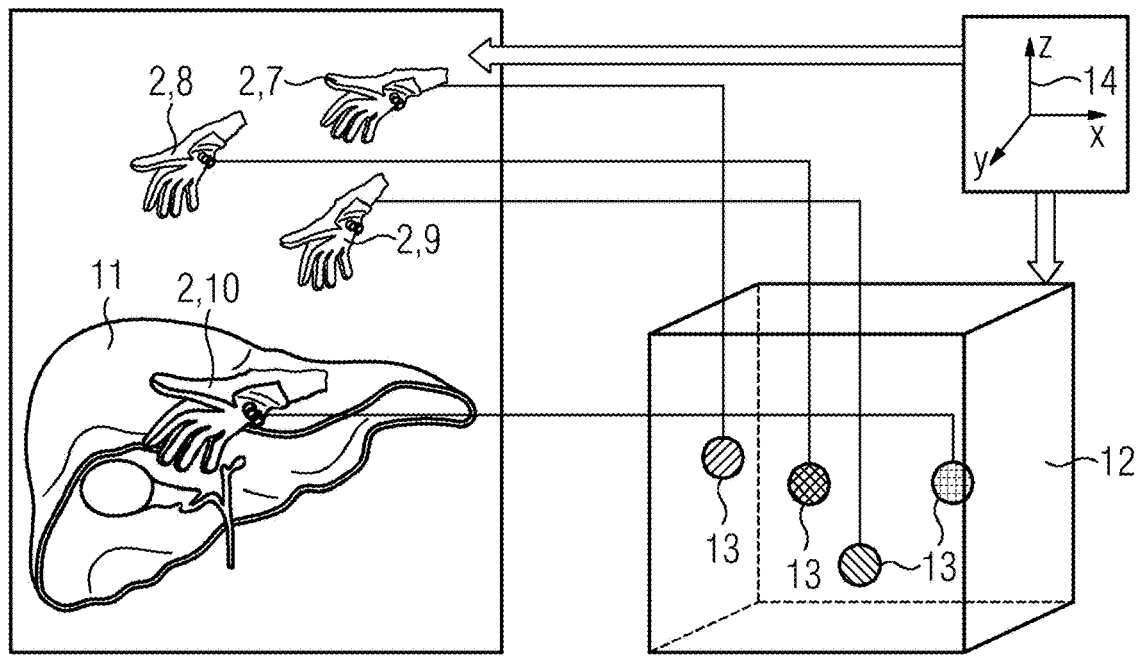
FIG. 4 depicts an exemplary schematic overview to illustrate recording of a data set of tactile data.

FIG. 4 shows a schematic overview in order to illustrate recording of the tactile data by the sensor glove 2. Here, the organ 11 and its surroundings are touched at different positions 7 to 10 by the sensor glove 2 and subjected to a compressive force, which is measured by the sensors 5. For example, so much pressure or force may be applied at the different positions 7 to 10 respectively that a tissue at the respective position 7 to 10 yields, so, using the measurement or sensor data recorded in the process, conclusions may then be made about the mechanical properties of the tissue at the respective position 7 to 10. Respective location coordinates of the positions 7 to 10 are determined and recorded. A tactile data set 12 having a plurality of data points 13 results from the measured values of the sensors 5 and the assigned positions 7 to 10 or their location coordinates. In the present example, the data points 13 represent in color-coded form the mechanical properties of the organ 11 or a tissue surrounding it at the different positions 7 to 10.

The tactile data set 12 and the pre-operative image data set 15 are registered with each other, with a shared coordinate system 14 being used.

In method act S4, the measurement or sensor data recorded by the sensors 5 or the tactile data set 12 is fed as input data to the classifier 29. In addition, the classifier 29 may also be provided with the pre-operative image data set 15. This may be dependent on an implementation or training of the classifier 29. From the provided or attached input data the classifier 29 then generates a classification of the tissue at the different positions 7 to 10. This classification may then be added to the tactile data set 12. Similarly, it is possible, however, to feed the raw measurement or sensor data from the sensors 5, optionally including the associated location coordinates, to the classifier 29 and to then generate the tactile data set 12 from the generated classification 29 and the coordinates of the positions 7 to 10.

In method act S5, in the present case preoperatively, the enriched image 16 is generated by merging the pre-operative image data set 15 and the tactile data set 12. The pre-operative image data set 15 may be a 3D-CT image data set but is not limited hereto. In order to merge the pre-operative image data set 15 and the tactile data set 12, as described, the pre-operative image data set 15 and the tactile data set 12 have to be registered with each other. Different possibilities exist for this. Therefore, for example, the sensor glove 2 or the sensors 5 or a respective position-determining device may be registered with the system 21, (for example, a patient couch on which the patient 17 is lying, a receiving unit attached to the patient couch, or the like). The preoperative image data set 15 may also be registered in relation to the patient 17 and/or the patient couch, so, overall, the sensors 5 or the tactile data set 12 are registered in relation to the pre-operative image data set 15. In addition or as an alternative, specified points or sections of the respective target object, here, for example, of the organ 11 or of the patient 17 therefore, may be touched by one or more of the sensor(s) 5 in order to thus determine or establish the shared coordinate system 14. In principle, an ultimately almost arbitrary method may be used to track the sensor glove 2 or the sensors 5 or determine the location coordinates of positions 7 to 10 and to register the tactile data set 12 with the pre-operative data set 15.

Figure 5:
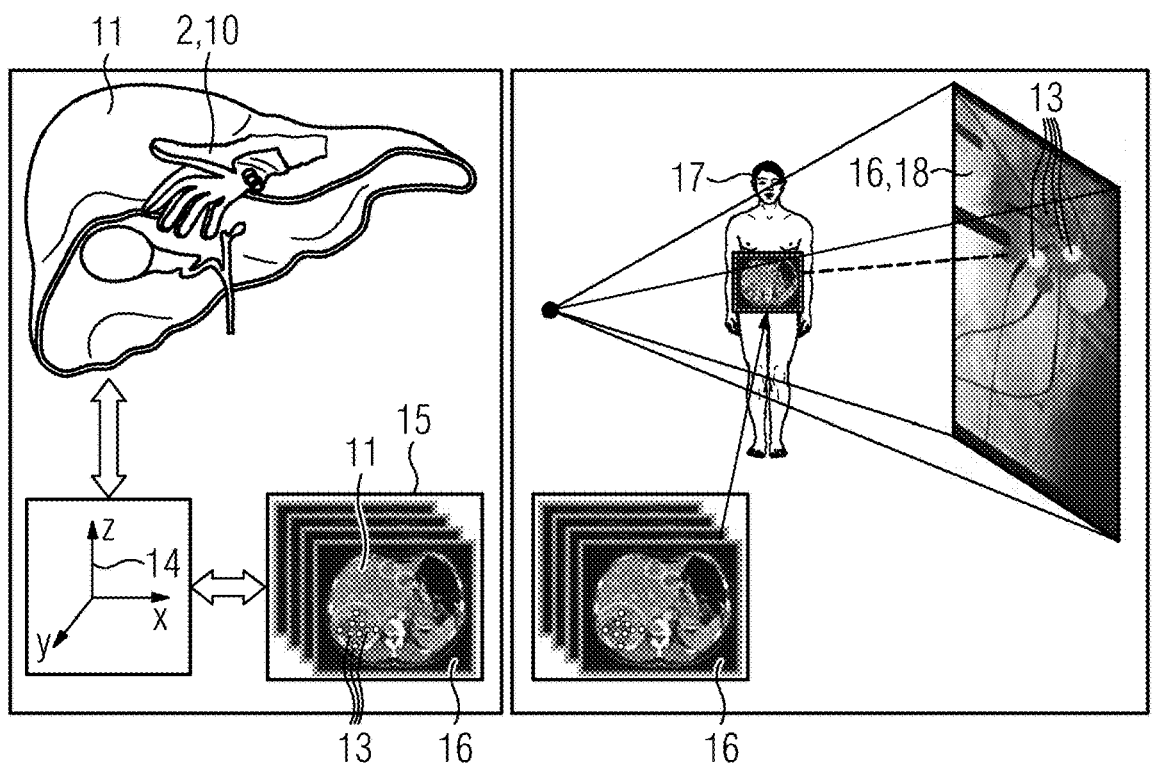
FIG. 5 depicts an exemplary schematic overview to illustrate a first variant of the method.

FIG. 5 shows a schematic overview to illustrate this first variant of the described method. The localizable or tracked sensor glove 2, which supplies results or measured values at different positions, here by way of example at the position 10, is shown schematically here. Because the sensor glove 2 is registered in relation to the pre-operative image data set 15, the corresponding positions 7 to 10 are therefore present, in principle, in the coordinate system of the pre-operative image data set 15 or in the shared coordinate system 14. Accordingly, the tactile data or the tactile data set 12 may be overlaid as additional data in the pre-operative image data set 15 to generate the enriched image 16. This then enables, for example, an improved pre-operative diagnosis and/or treatment planning and/or a particularly reliable implementation of a corresponding procedure.

Furthermore, in method act S6, a live image 18 of the patient 17 may be recorded. The live image 18 may—optionally likewise by the system 21—be recorded as a 2D radioscopy image, (e.g., immediately before or during the respective procedure). In method act S7, the live image 18 may be automatically registered with the pre-operative image data set 15 or with the shared coordinate system 14 and ultimately also with the tactile data set 12. Accordingly, in method act S8, a new enriched image 16 may be generated by merging the pre-operative, enriched image 16 existing up until then or the pre-operative image data set 15 and the tactile data set 12 with the live image 18. This is illustrated here by the fact that the color-coded data points 13 are overlaid in the live image 18 as a superimposition. For the sake of clarity, only some of the data points 13 are identified here.

Figure 6:
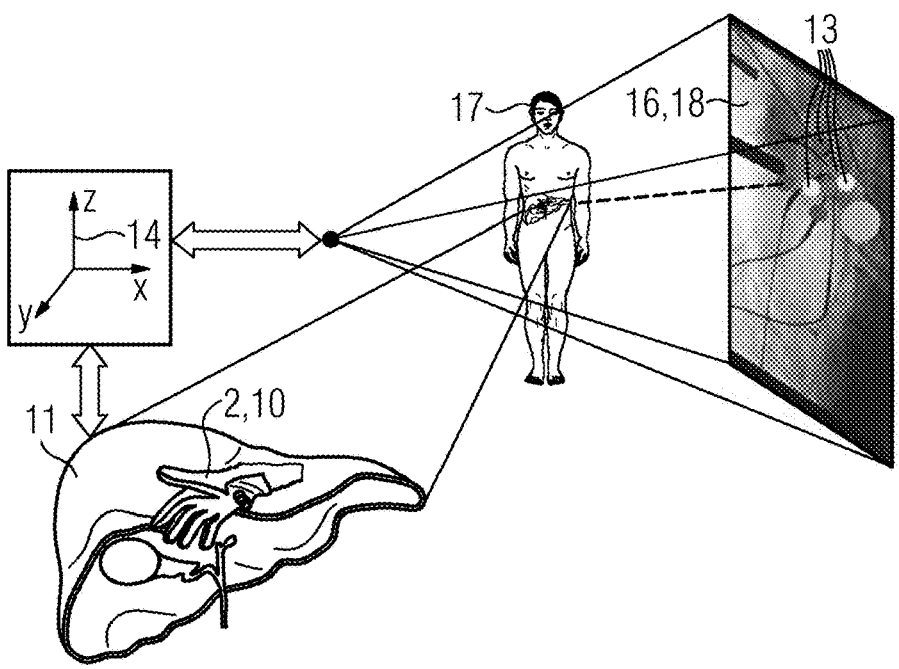
FIG. 6 depicts an exemplary schematic overview to illustrate a second variant of the method.

FIG. 6 shows a further schematic overview to illustrate a second variant of the described method. The tactile data set 12 or its data points 13 may be merged, without using the pre-operative data set 15, directly with the live image 18 in order to generate the enriched image 16. The sensor glove 2 and the live image 18 or the image acquisition device 22 used for recording the live image 18 may likewise be registered with each other or via a shared coordinate system 14. In particular, the sensor glove 2 or the sensors 5 may be registered directly with the imaging modality used in each case. The described registering methods may likewise be used for this. Advantageously, the enriched image 16 may also be generated and used for support in real time or live imaging therefore, without the pre-operative image data set 15 having to be used. Here too, the tactile data set 12 or the data points 13 may be overlaid as palpatory findings, which characterize the mechanical properties of the respective target object, which may not emerge, or may not emerge quantitatively, from the live image 18 alone, with the live image 18 therefore in order to generate the enriched image 16.

Figure 7:
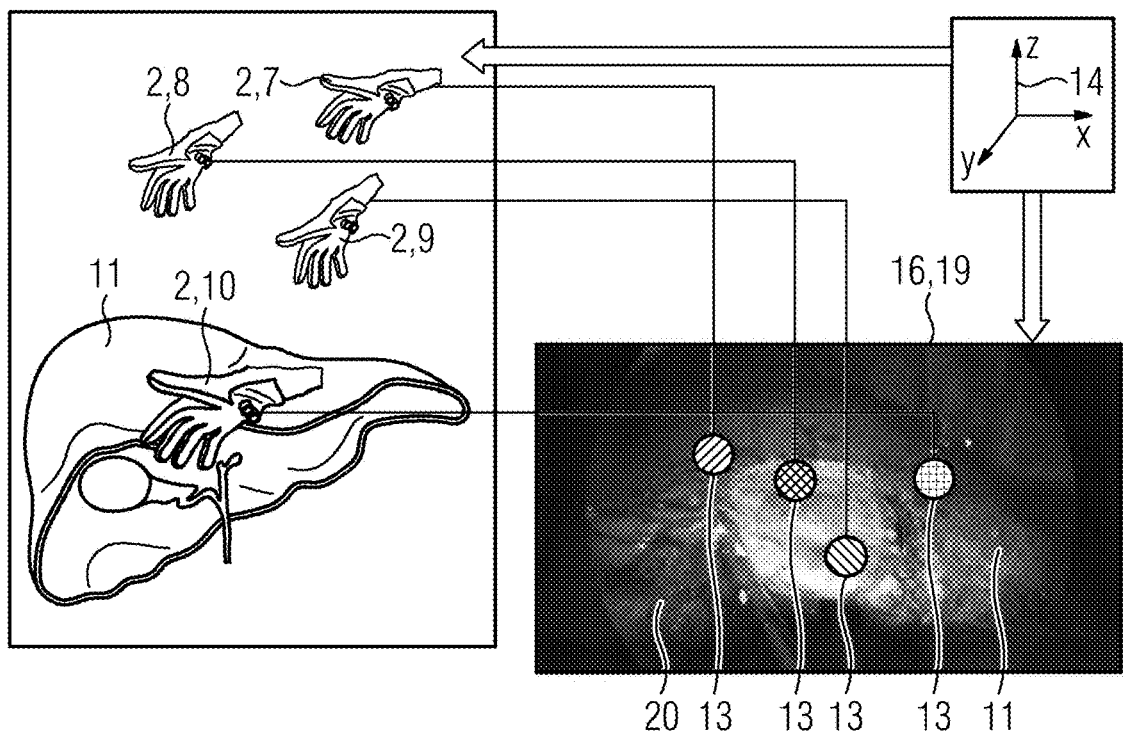
FIG. 7 depicts an exemplary schematic overview to illustrate a third variant of the method.

FIG. 7 shows a further schematic overview to illustrate the described method in a third variant. Here too the tactile data is recorded by the sensor glove 2. Instead of the live image 18, which may be an angiography or fluoroscopy image, an optical laparoscopy image 19 is used here, however. The tactile data set 12 is therefore merged here with the laparoscopy image 19 to generate the enriched image 16.

Irrespective of the variant of the method for generating the enriched image 16, this image may be output in method act S8 on the display 30. The display 30 may include a screen, augmented reality (AR) goggles, virtual reality (VR) goggles, and/or the like.

Further supplementary data 20 may also be overlaid in the enriched image 16 in addition to the tactile data. This supplementary data 20 may be image data from a further imaging modality or virtual object. Therefore, for example, a vascular tree of the organ 11 imaged previously in a contrast medium method, a marking generated, (e.g., by a dye or depiction of different tissue regions), a planned instrument path, and/or the like may be [as] the supplementary data 20.

Finally, the enriched image 16 may impart more information content to, in this case, the medical staff in a single representation so, ultimately, for example, a more accurate and more conservative tumor resection may be rendered possible. Overall, the described examples demonstrate how a further improved successful treatment may be rendered possible in image-supported medicine by registering and merging tactile data with image data, for example laparoscopy images or X-ray images.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for generating an enriched image, the method comprising:
    acquiring image data of a target object, the image data recorded by an imaging modality;
    acquiring tactile data for the target object by a sensor device comprising at least one sensor integrated in at least one fingertip region of the sensor device, wherein the tactile data characterizes a mechanical resistance of at least one section of the target object against a force applied to the target object;
    automatically spatially tracking the at least one sensor while the at least one sensor is recording the tactile data;
    automatically assigning a respective recording location to the tactile data based on the automatic spatial tracking, wherein the tactile data is annotated with a respective position and respective coordinates, and wherein an actual measurement of the at least one sensor and the respective position or the respective coordinates are in a form of two data sets, which are each provided with time stamps; and
    generating the enriched image by merging the image data with the tactile data and/or a classification derived from the tactile data of the at least one section of the target object,
    wherein, in order to merge the image data with the tactile data, the image data and the tactile data are registered with each other using a coordinate system.

2. The method of claim 1, wherein the image data is a live image of the target object.

3. The method of claim 1, wherein the image data is a preoperative image data set of the target object.

4. The method of claim 3, wherein the preoperative image data set is a three-dimensional image data set.

5. The method of claim 1, wherein the sensor device is configured as a glove having the at least one sensor integrated into the at least one fingertip region of the glove, and
    wherein at least one corresponding force and/or pressure sensor is integrated in the at least one fingertip region of the glove.

6. The method of claim 1, wherein the tactile data is acquired at least partially in a form of a user input.

7. The method of claim 1, wherein the tactile data is acquired for a plurality of spatially distributed points or sections of the target object.

8. The method of claim 1, wherein the tactile data is represented in the enriched image so as to be color-coded according to a specified scale.

9. The method of claim 8, wherein the tactile data for generating the enriched image is overlaid on the image data at least in a form of color-coded points or symbols.

10. The method of claim 1, wherein the tactile data is represented in the enriched image at least in a form of numerical data that quantify the mechanical resistance of the target object according to underlying measurement data or sensor data.

11. The method of claim 10, wherein the underlying measurement data or the sensor data is fed to an automatic classifier as input data,
    wherein the automatic classifier is configured to classify at least the respective section of the target object as a function of the input data in respect of a tissue type and/or in respect of a state of health, and
    wherein a corresponding classification generated respectively by the automatic classifier by processing the input data at least as part of the tactile data or in addition thereto is integrated in the enriched image.

12. The method of claim 11, wherein the automatic classifier is a neural network.

13. The method of claim 1, wherein the tactile data is fed to an automatic classifier as input data,
    wherein the automatic classifier is configured to classify at least the respective section of the target object as a function of the input data in respect of a tissue type and/or in respect of a state of health, and
    wherein a corresponding classification generated respectively by the automatic classifier by processing the input data at least as part of the tactile data or in addition thereto is integrated in the enriched image.

14. The method of claim 13, wherein the automatic classifier is a neural network.

15. A system configured to generate an enriched image of a target object, the system comprising:
    at least one acquisition device configured to acquire image data and tactile data of the target object, wherein the tactile data characterizes a mechanical strength, rigidity, and/or elasticity of at least one section of the target object, and wherein the at least one acquisition device comprises at least one sensor integrated in at least one fingertip region of the at least one acquisition device; and
    a data processing device configured to process the image data and the tactile data to form the enriched image of the target object, wherein the enriched image represents both the image data and the tactile data,
    wherein the enriched image of the target object is configured to be formed by merging the image data with the tactile data and/or a classification derived from the tactile data of the at least one section of the target object, wherein, in order to merge the image data with the tactile data, the image data and the tactile data are configured to be registered with each other using a coordinate system, wherein the at least one sensor is configured to be automatically spatially tracked while the at least one sensor is recording the tactile data, wherein a respective recording location is configured to be automatically assigned to the tactile data based on the automatic spatial tracking, wherein the tactile data is annotated with a respective position and respective coordinates, and wherein an actual measurement of the at least one sensor and the respective position or the respective coordinates are in a form of two data sets, which are each provided with time stamps.

16. A non-transitory computer-readable storage medium comprising a computer program, wherein the computer program, when executed by a processor of a system, is configured to cause the system to:

acquire image data of a target object;

control a sensor device to acquire tactile data for the target object, wherein the tactile data characterizes a mechanical resistance of at least one section of the target object against a force applied to the target object, wherein the sensor device comprises at least one sensor integrated in at least one fingertip region of the sensor device;

automatically spatially track the at least one sensor while the at least one sensor is recording the tactile data;

automatically assign a respective recording location to the tactile data based on the automatic spatial tracking, wherein the tactile data is annotated with a respective position and respective coordinates, and wherein an actual measurement of the at least one sensor and the respective position or the respective coordinates are in a form of two data sets, which are each provided with time stamps; and generate an enriched image by merging the image data with the tactile data and/or a classification derived from the tactile data of the at least one section of the target object, wherein, in order to merge the image data with the tactile data, the image data and the tactile data are registered with each other using a coordinate system.

* * * * *